United States Patent [19]
Hillman, Jr.

[11] 3,790,855
[45] Feb. 5, 1974

[54] ELECTRONIC CONTROL MODULE FOR ANTI-SKID BRAKING SYSTEMS

[75] Inventor: Allen F. Hillman, Jr., Muncy, Pa.

[73] Assignee: GTE Laboratories Incorporated, Waltham, Mass.

[22] Filed: Dec. 4, 1972

[21] Appl. No.: 311,927

[52] U.S. Cl. .................................................... 317/5
[51] Int. Cl. ......................... B60t 8/08, G01p 15/08
[58] Field of Search ......................................... 317/5

[56] References Cited
UNITED STATES PATENTS

| | | | |
|---|---|---|---|
| 3,578,819 | 5/1971 | Atkins.................................... | 317/5 |
| 3,611,109 | 10/1971 | Jones...................................... | 317/5 |
| 3,614,173 | 10/1971 | Branson................................. | 317/5 |
| 3,622,208 | 11/1971 | Krugler, Jr............................. | 317/5 |
| 3,680,655 | 8/1972 | Beyerlein et al....................... | 317/5 |
| 3,710,186 | 1/1973 | Sharp..................................... | 317/5 |

*Primary Examiner*—L. T. Hix
*Attorney, Agent, or Firm*—Irving M. Kriegsman

[57] ABSTRACT

An electronic control module for an automatic anti-skid braking system for vehicles such as automobiles. A velocity-sensing mechanism associated with a vehicle operates while the vehicle is in motion to produce a pulse train having a frequency varying in direct proportion to the rotational velocity of the rear wheels. The varying-frequency pulse train is converted to an amplitude-varying dc "velocity" voltage signal, also directly proportional to the rotational velocity of the rear wheels, and differentiated by a capacitor included in a differentiator-amplifier circuit to produce positive-going and negative-going voltage pulses corresponding respectively, to increases and decreases in the voltage level of the "velocity" voltage signal. The negative-going voltage pulses, corresponding to decreases in velocity, are then amplified and inverted by the differentiator-amplifier circuit and compared with a dc "deceleration" reference voltage having a value corresponding to a predetermined value of wheel deceleration existing during braking of a vehicle and indicating the imminence of a skidding or wheel lock-up situation.

If the wheel deceleration of a vehicle being braked exceeds the predetermined value of wheel deceleration at any given moment, thereby indicating an impending wheel lock-up situation, and, in addition, the decelerating vehicle is traveling at a velocity exceeding a predetermined cut-out velocity below which anti-skid braking operation is not considered necessary (e.g., below five miles/hour), an output pulse is produced by the differentiator-amplifier circuit which exceeds the value of the dc "deceleration" reference voltage level. A load control pulse is then produced and applied to a load control circuit. The load control circuit operates in response to the load control pulse, and also to voltages from a vehicle deceleration switch associated with the vehicle, to apply to a load (e.g., a brake-control mechanism) control signals of either a first repetition rate or a second repetition rate for releasing the brakes of the vehicle. Control signals of the first repetition rate are applied to the load when a first voltage is produced by the deceleration switch during an impending wheel lock-up situation and control signals of the second repetition rate are applied to the load when a second voltage is produced by the deceleration switch during an impending wheel lock-up situation. The first voltage is produced by the deceleration switch when the vehicle being braked is decelerating at a rate less than a predetermined rate and, when it occurs during an impending wheel lock-up situation, indicates that the road surface on which braking is taking place has a low coefficient of friction, that is, it is a wet road surface or a snow, ice, or oil-covered surface. The second voltage is produced by the deceleration switch when the vehicle being braked is decelerating at a rate greater than the predetermined rate and, when it occurs during an impending wheel lock-up situation, indicates that the road surface on which braking is taking place has high coefficient of friction, that is, it is a dry road surface.

15 Claims, 14 Drawing Figures

ELECTRONIC CONTROL MODULE FOR ANTI-SKID BRAKING SYSTEMS

BACKGROUND OF THE INVENTION

The present invention relates to electronic circuitry and, more particularly, to an electronic control module for use in anti-skid braking systems for vehicles such as automobiles.

There has existed for several years a great need and demand for automatic anti-skid braking systems for providing directional stability to automobiles experiencing or about to experience wheel lock-up conditions while at the same time maintaining stopping distances within reasonable values. Various automatic anti-skid braking systems, both electronic and mechanical in nature, have been proposed heretofore for use with automobiles, but for reasons such as excessive cost, weight, or complexity, or for reasons of poor performance or various technical problems, most of these anti-skid braking systems have not received wide commercial acceptance by automobile manufacturers. One anti-skid vehicle braking system which has been used commercially includes an electronic control module for determining when a rear wheel lock-up condition is present and for appropriately operating a brake-control mechanism to stabilize the vehicle so as to enable the operator to bring the vehicle under control. The stimulus, or input, which is used in the above-mentioned system for initiating operation of the brake-control mechanism is a wheel lock-up condition. The present invention is similarly concerned with an electronic control module for automatic anti-skid braking systems but the electronic module of the present invention differs significantly from the electronic control module of the above-mentioned system in that it provides for operation of the brake-control mechanism before a wheel lock-up situation can occur, thereby assuring earlier and more effective stabilization of a vehicle about to experience a wheel lock-up situation. Another significant difference is that with the electronic control module of the present invention the brake-control mechanism of a vehicle being braked and about to experience a wheel lock-up situation may be actuated at a first repetition rate or a second repetition rate to release the brakes and permit the wheels to spin up, the particular rate depending on the condition of the road surface at the time of braking, that is, whether the road surface has a low coefficient of friction, such as a wet road surface or a snow, ice, or oil-covered surface, or a high coefficient of friction, such as a dry road surface. These road surface conditions are indicated by voltages produced by a deceleration switch, such as a conventional decelerometer, during impending wheel lock-up situations.

BRIEF SUMMARY OF THE INVENTION

Briefly, in accordance with the present invention, an electronic module for an anti-skid braking system is provided for operating the brake control mechanism of a wheeled vehicle. The electronic module includes a first means operative while the vehicle is in motion to provide a velocity signal representative of the rotational velocity of at least one wheel of the vehicle. A second means coupled to the first means operates to detect decreases in the value of the velocity signal produced by the first means and to produce output signals corresponding to the decreases. A third means coupled to the second means operates to compare the value of each output signal produced by the second means with the value of a deceleration reference signal corresponding to a predetermined value of wheel deceleration indicating the imminence of a wheel lock-up condition and to produce an output signal whenever the value of an output signal produced by the second means bears a predetermined relationship to the value of the deceleration reference signal.

The electronic module of the invention further includes a deceleration means associated with the vehicle. The deceleration means operates when the vehicle decelerates at a rate less than a predetermined rate to produce a first control signal and operates when the vehicle decelerates at a rate greater than the predetermined rate to produce a second control signal. A load control means coupled to the third means and to the deceleration means operates in response to an output signal produced by the third means and in response to a first control signal produced by the deceleration means to produce and apply to an output connection a first train of output pulses having a first repetition rate. The load control means further operates in response to an output signal produced by the third means and in response to a second control signal produced by the deceleration means to produce and apply to the output connection a second train of output pulses having a second repetition rate.

BRIEF DESCRIPTION OF THE DRAWING

Figure 1:
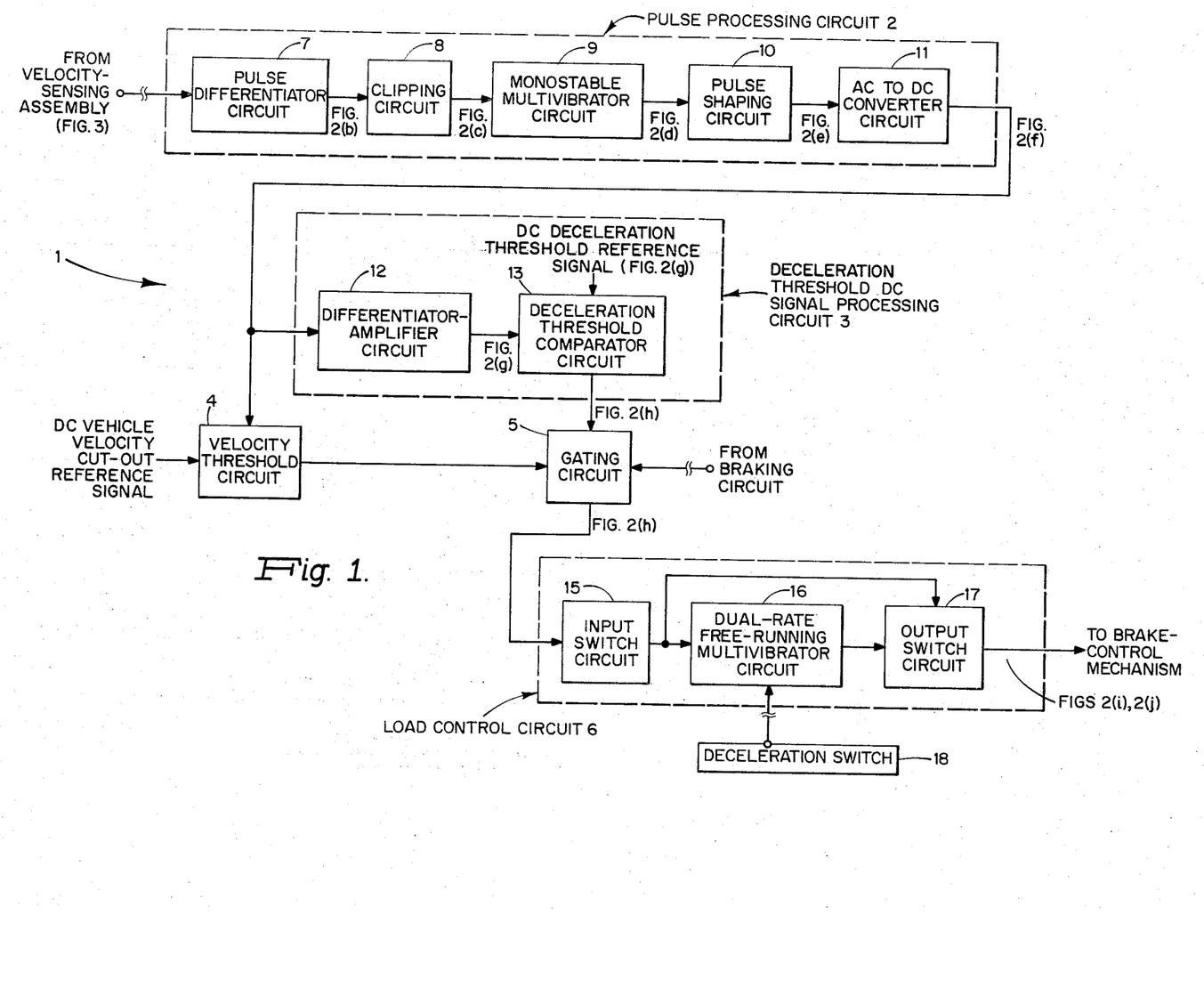
FIG. 1 is a schematic block diagrammatic representation of an electronic control module in accordance with the invention for an automatic anti-skid braking system for use with vehicles.

FIGS. 2(a)–2(j) are waveforms of electrical signals occurring at various points in the electronic control module shown in FIG. 1;

GENERAL DESCRIPTION OF THE INVENTION — FIG. 1

Referring now to FIG. 1, there is shown an electronic control module 1 for an automatic anti-skid braking system in accordance with the present invention. As indicated in FIG. 1, the electronic control module 1 generally includes a pulse processing circuit 2, a deceleration threshold dc signal processing circuit 3, a velocity threshold circuit 4, a gating circuit 5, a load control circuit 6, and a deceleration switch 18. The pulse processing circuit 2 further includes, in a series arrangement, a pulse differentiator circuit 7, a clipping circuit 8, a monostable multivibrator circuit 9, a pulse shaping circuit 10, and an ac to dc converter circuit 11. As will be discussed fully hereinafter, the purpose of the pulse processing circuit 2 is to convert a varying-frequency sinusoidal pulse train received from a velocity-sensing mechanism associated with a vehicle and representative of the variations in rotational velocity of the rear wheels of the vehicle to an amplitude-varying dc "velocity" voltage signal directly proportional to the rotational velocity of the rear wheels of the vehicle.

The dc "velocity" voltage signal produced by the pulse processing circuit 2 is applied to the deceleration threshold dc signal processing circuit 3 and also to the velocity threshold circuit 4. The deceleration threshold dc signal processing circuit 3 includes a differentiator-amplifier circuit 12 and a deceleration threshold comparator circuit 13. As will also be discussed fully hereinafter in connection with a preferred form of the deceleration threshold dc signal processing circuit 3, the deceleration threshold dc signal processing circuit 3 operates to detect changes in the voltage level of the "velocity" voltage signal produced by the pulse processing circuit 2. These voltage changes are amplified, and the voltage changes produced as a result of vehicle deceleration are compared with a dc "deceleration" threshold reference voltage level having a value corresponding to a predetermined value of wheel deceleration existing during the braking of a vehicle and indicating the imminence of a wheel lock-up, or skidding, condition. If the wheel deceleration of a vehicle being braked exceeds the predetermined value of wheel deceleration at any given moment, thereby indicating an impending wheel lock-up or skidding situation, a voltage pulse is produced in the deceleration threshold dc signal processing circuit 3 which exceeds the value of the "deceleration" threshold reference voltage level. A load control pulse is produced by the deceleration threshold dc signal processing circuit 3 for operating the brake-control mechanism (not shown) of the vehicle to release the brakes of the vehicle and to allow the rear wheels to spin up.

The load control pulse applied to the gating circuit 5 is gated through the gating circuit 5 to the load control circuit 6 in response to signals produced simultaneously by the velocity threshold circuit 4 and a conventional braking circuit (not shown). More specifically, a signal is produced and applied to the gating circuit 5 by the velocity threshold circuit 4 when the vehicle being braked is travelling at a velocity equal to or exceeding a threshold cut-out velocity below which operation of the brake-control mechanism is considered unnecessary, for example, below 5 miles per hour, and a signal is produced and applied to the gating circuit 5 by the braking circuit during application of the brakes by the operator. In the above fashion, automatic brake control is effected only when the vehicle is travelling at a velocity equal to or exceeding a minimum threshold cut-out velocity and, at the same time, the brakes are being applied by the operator of the vehicle.

The load control circuit 6 includes, as indicated in FIG. 1, an input switch circuit 15, a dual-rate free-running multivibrator circuit 16, and an output switch circuit 17. As will be described fully hereinafter in connection with a preferred form of the load control circuit 6, the load control circuit 6 operates to cause control signals to be applied to the brake-control mechanism of a vehicle at a first repetition rate when the vehicle at the time of braking is travelling on a road surface having a low coefficient of friction, for example, a wet road surface, or a snow, ice, or oil-covered road surface, or control signals of a second, higher repetition rate when the vehicle at the time of braking is travelling on a road surface having a high coefficient of friction, for example, a dry road surface. The two types or road surface conditions are indicated by control voltages produced by the deceleration switch 18 during impending wheel lock-up situations, a first voltage being produced by the deceleration switch 18 when the vehicle being braked is decelerating at a rate less than a predetermined rate, for example, less than 16 ft/sec/sec, and a second voltage being produced by the deceleration switch 18 when the vehicle being braked is decelerating at a rate greater than the predetermined rate, that is, above 16 ft/sec/sec. The brake-control mechanism operates in response to the control signals of the first repetition rate or the second repetition rate to alternately release and apply the brakes of the vehicle at the first rate or the second rate, respectively. At such time as the value of the wheel deceleration no longer exceeds the predetermined value of wheel deceleration, normal braking action on the part of the operator is allowed to take place until such time, if any, as further brake action by the electronic control module 1 may become necessary or the vehicle velocity drops below 5 miles/hour. During the time of the operation of the brake-control mechanism by the electronic control module 1, the operator's braking action is over-ridden by the action of the electronic control module 1. The operation of the electronic control module 1 of FIG. 1 will now be described in detail in conjunction with the electrical waveforms of FIGS. 2(a)–2(j) and in conjunction with FIG. 3.

DETAILED OPERATION — FIGS. 1, 2(a)–2(j), and 3

Figures 2A, 2J:
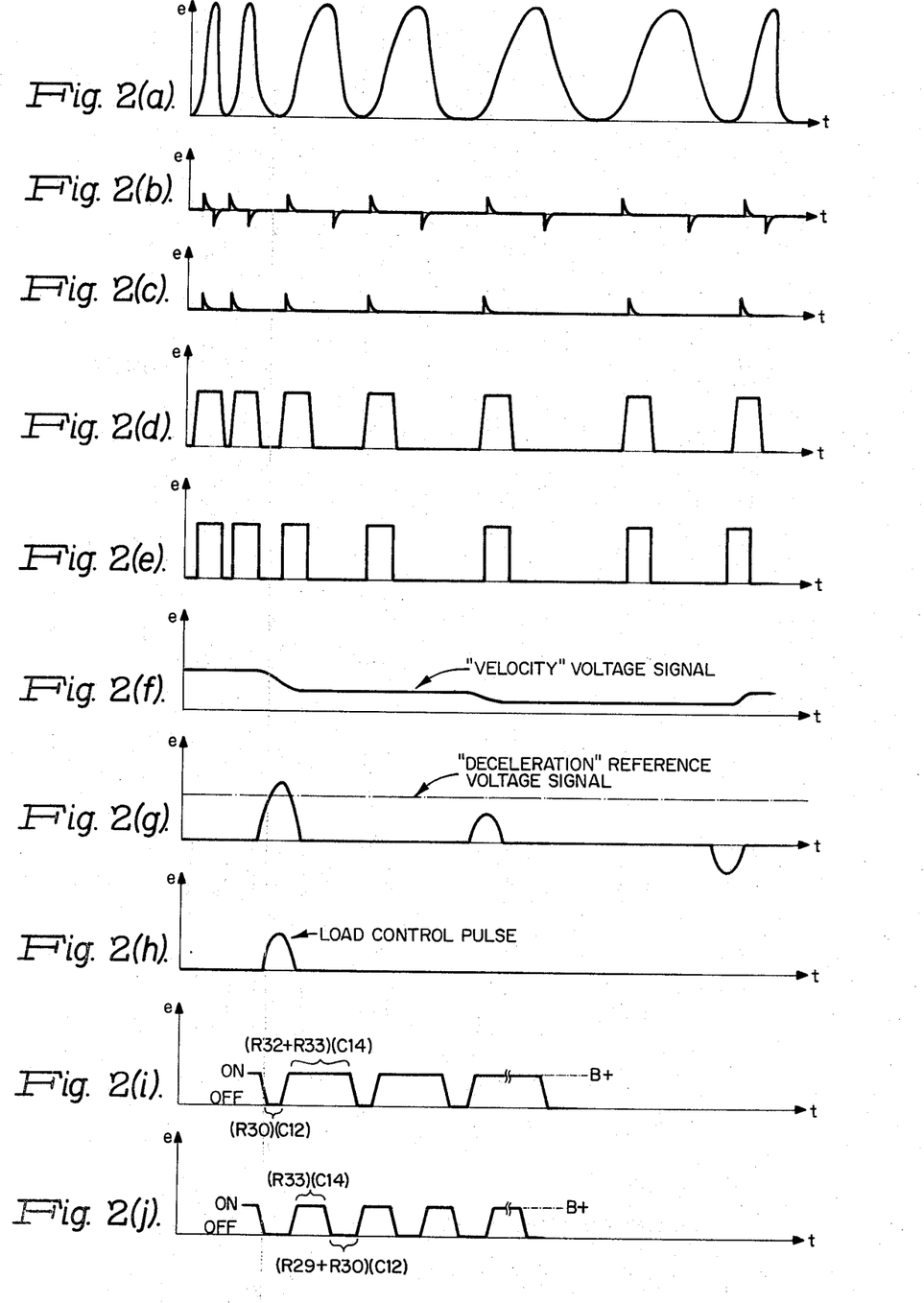

When a vehicle is in motion, a sinusoidal constant amplitude signal having a frequency varying in direct proportion to the rotational velocity of the rear wheels of the vehicle is produced by a velocity-sensing mechanism associated with the wheels of the vehicle and applied to the pulse differentiator circuit 7. FIG. 2(a) illustrates the waveform of a portion of a typical sinusoidal output signal produced by the wheel velocity-sensing mechanism and applied to the pulse differentiator circuit 7. Although many different types of wheel velocity-sensing mechanisms known to those skilled in the art may be used to provide a constant-amplitude, varying-frequency signal such as shown in FIG. 2(a), a particularly suitable wheel velocity-sensing mechanism is shown schematically in FIG. 3 and includes a circular slotted disc D fixedly mounted on the drive shaft S of a vehicle and rotatable therewith, a fixed light source LS arranged on one side of the slotted disc, and a fixed photoresponsive device PR (e.g., a photodiode) arranged on the other side of the disc in optical alignment with the light source. As the drive shaft S rotates, the light from the light source LS is chopped by the rotating slotted disc D and the chopped light is received by the photoresponsive device PR and converted to a train of constant-amplitude pulse signals having a frequency varying in direct proportion to the rotational velocity v of the drive shaft S. Since both of the rear wheels of the vehicle cooperate with the drive shaft and rotate with the drive shaft, the constant-amplitude varying-frequency signals produced by the photoresponsive device PR may also be considered to represent the rotational velocity of the rear wheels.

The pulse differentiator circuit 7 operates to differentiate the leading and trailing edge of each pulse received thereby, producing a positive-going voltage spike corresponding to the leading edge of the pulse and a negative-going voltage spike corresponding to the trailing edge of the pulse, as indicated in FIG. 2(b). The negative-going voltage spikes in the train of voltage spikes produced by the pulse differentiator circuit 7 are then removed by the clipping circuit 8, as indicated in FIG. 2(c), and the positive-going voltage spikes are applied to the monostable multivibrator circuit 9. The monostable multivibrator circuit 9 operates in response to the positive-going voltage spikes to produce corresponding output pulses each having a predetermined width and amplitude, FIG. 2(d). To insure that the output pulses produced by the monostable multivibrator circuit 9 have very fast rise and fall times, they are shaped by the pulse shaping circuit 10, FIG. 2(e). The train of output pulses provided by the pulse shaping circuit 10, of the same frequency as the train of output pulses produced by the velocity-sensing mechanism (FIG. 3) but of a standardized pulse width more suitable for processing over a wide range of frequency variations, is then applied to the ac to dc converter circuit 11. The ac to dc converter circuit 11 converts the train of output pulses produced by the pulse shaping circuit 10 to a dc "velocity" voltage signal having an amplitude-varying in direct proportion to the rotational velocity of the drive shaft of the vehicle, and, therefore, the rear wheels of the vehicle. The waveform of the amplitude-varying dc "velocity" voltage signal corresponding to the trains of pulses shown in FIGS. 2(a) and 2(e) is shown in FIG. 2(f).

Figures 3, 4:
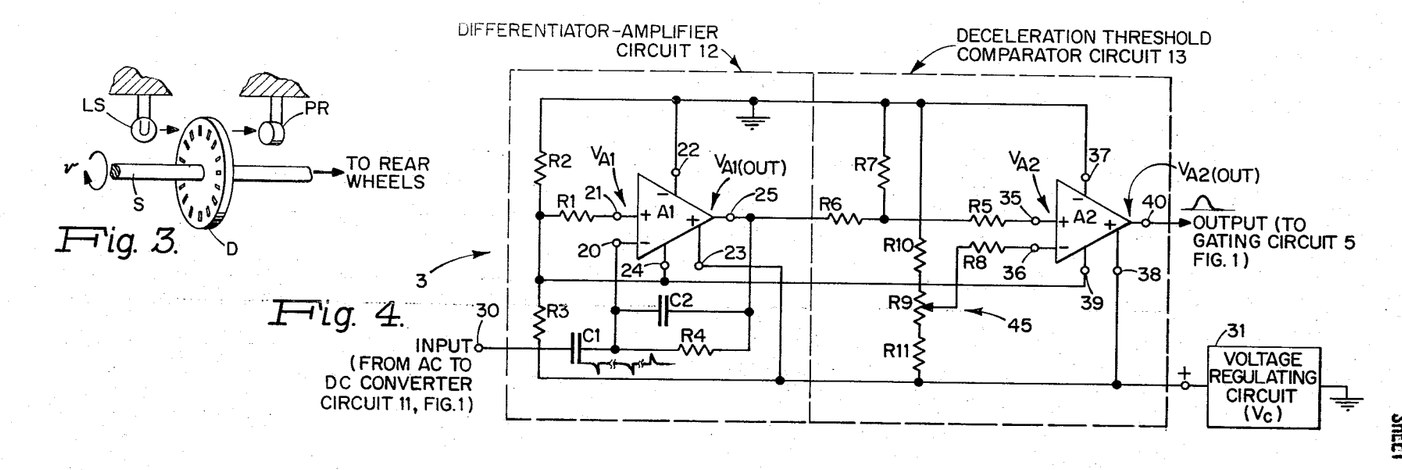
FIG. 3 is a semi-schematic representation of a velocity-sensing mechanism which may be employed for providing input signals to the electronic control module of FIG. 1.
FIG. 4 is a schematic representation of a differentiator-amplifier circuit and comparator circuit of a preferred form which may be employed in the electronic control module of FIG. 1.

The dc "velocity" voltage signal is then applied to the differentiator-amplifier circuit 12 and also to the velocity threshold circuit 4. The differentiator-amplifier circuit 12, a particularly suitable implementation of which is shown in FIG. 4, to be described in detail hereinafter, operates to differentiate the dc "velocity" voltage signal to derive an acceleration-deceleration voltage signal including positive-going and negative-going voltage spikes corresponding, respectively, to increases and decreases in the value of the "velocity" voltage signal. The train of bi-polar voltage spikes produced by the differentiator-amplifier circuit 12, shown in FIG. 2(g), therefore represents the expression $\pm dv/dt$. After processing (e.g., amplification and inversion) in the differentiator-amplifier circuit 12, the bi-polar voltage spikes, FIG. 2(g), are applied to the deceleration threshold comparator circuit 13 and the positive-going spikes (inverted negative-going spikes) are compared therein with a constant, positive dc "deceleration" reference voltage signal, also shown in FIG. 2(g), having a value corresponding to a predetermined value of wheel deceleration existing during the braking of a vehicle and indicating an imminent wheel lock-up, or skidding, situation. Each time that the value of an amplified-inverted voltage spike produced by the differentiator-amplifier circuit 12 exceeds the value of the dc "deceleration" reference voltage signal, thereby indicating an imminent wheel lock-up, or skidding, situation, a load control pulse such as shown in FIG. 2(h) is produced by the deceleration threshold comparator circuit 13 and applied as a first input signal to the gating circuit 5.

Additional signals, for gating each load control pulse produced by the deceleration threshold comparator circuit 13 through the gating circuit 5 to the load control circuit 6, are received by the gating circuit 5 from the velocity threshold circuit 4 and from the braking circuit. Specifically, a gating signal is produced by the velocity threshold circuit 4 and applied to the gating circuit 5 at such time as the value of the dc "velocity" voltage signal produced at the output of the ac to dc converter circuit 11 and applied to the velocity threshold circuit 4 equals or exceeds the value of a dc vehicle "velocity" cutout reference voltage signal corresponding to a particular cutout velocity of a vehicle below which it is considered unnecessary to operate the brake-control mechanism. For example, it has been found unnecessary to operate the brake-control mechanism to release the brakes of a vehicle for a vehicle traveling at a velocity equal to or less than 5 miles/hour. A second gating signal is produced by the braking circuit and applied to the gating circuit 5 when the brakes are applied by the operator of the vehicle. Thus, a load control pulse produced by the deceleration threshold comparator circuit 13 is gated through the gating circuit 5 to the load control circuit 6 only when the velocity of the vehicle exceeds 5 miles/hour and, in addition, the brakes are applied. Assuming that the abovementioned input conditions for the gating circuit 5 are satisfied, a load control pulse produced by the deceleration threshold comparator circuit 13 is gated through the gating circuit 5 to the input switch circuit 15 of the load control circuit 6.

As will be described in greater detail hereinafter in connection with a particularly suitable implementation of the load control circuit 6, shown in FIG. 5, the input switch circuit 15 operates in response to each load control pulse [FIG. 2(h)] produced by the deceleration threshold comparator circuit 13 and gated through the gating circuit 5 to produce an output signal having a fixed duration. This output signal is applied to the dual-rate free-running multivibrator circuit 16 and also to the output switch circuit 17. The dual-rate free-running multivibrator circuit 16 operates in response to the output signal produced by the input switch circuit 15, and also in response to a first dc voltage signal or a second dc voltage signal produced by the vehicle deceleration switch 18 associated with the vehicle (mounted at the center of gravity of the vehicle, for example), to produce an output pulse train having a first repetition rate, or a second repetition rate, for example, as shown in FIGS. 2(i) and 2(j). The duration of an output pulse train produced by the dual-rate free-running multivibrator circuit 16 is the same as the duration of the output signal produced by the input switch circuit 15. For the sake of clarity, the pulse trains of FIGS. 2(i) and 2(j) are shown on an expanded scale in FIGS. 2(i) and 2(j). The abovementioned first dc voltage signal is produced by the deceleration switch 18 when the vehicle being braked is decelerating at a rate less than a predetermined rate, for example, less than 16 ft/sec/sec and, when it occurs during an impending wheel lock-up situation, indicates that the vehicle is being braked on a road surface having a low coefficient of friction, such as a wet road surface, or a snow, ice, or oil-covered surface. Thus, when the first dc voltage signal is produced by the deceleration switch 18, the vehicle is decelerating slowly. The second dc voltage signal is produced by the deceleration switch 18 when the vehicle being braked is decelerating at a rate greater than the predetermined rate, that is, above 16 ft/sec/sec, and, when it occurs during an impending wheel lock-up situation, indicates that the vehicle is being braked on a road surface having a high coefficient of friction, such as a dry road surface. Thus, when the second dc voltage signal is produced by the deceleration switch 18, the vehicle is decelerating rapidly.

The output pulse train produced by the dual-rate free-running multivibrator circuit 16, of the first repetition rate or the second repetition rate, is applied to the output switch circuit 17 and, with the output switch 17 enabled by the input switch circuit 15, is inverted and gated through the output switch circuit 17 to the brake-control mechanism. The brake-control mechanism operates to repetitively release and apply the brakes of the vehicle at the first rate or the second rate for the duration of the output signal produced by the input switch circuit 15. The wheels of the vehicle are therefore allowed to spin up (accelerate). When the vehicle has sufficiently stabilized, normal braking action on the part of the operator is allowed to take place until further brake control by the electronic control module 1 becomes necessary or until the velocity of the vehicle drops below 5 miles/hour. Thus, it is apparent that the brake-control mechanism of a vehicle operating on a road surface having a low coefficient of friction at the time of braking is operated at a different rate [FIG. 2(i)] than the brake-control mechanism of a vehicle operating on a road surface having a high coefficient of friction at the time of braking [FIG. 2(j)]. This dual-rate operation therefore permits the operation of the brake control mechanism to be tailored to the particular existing road surface conditions.

Figure 5:
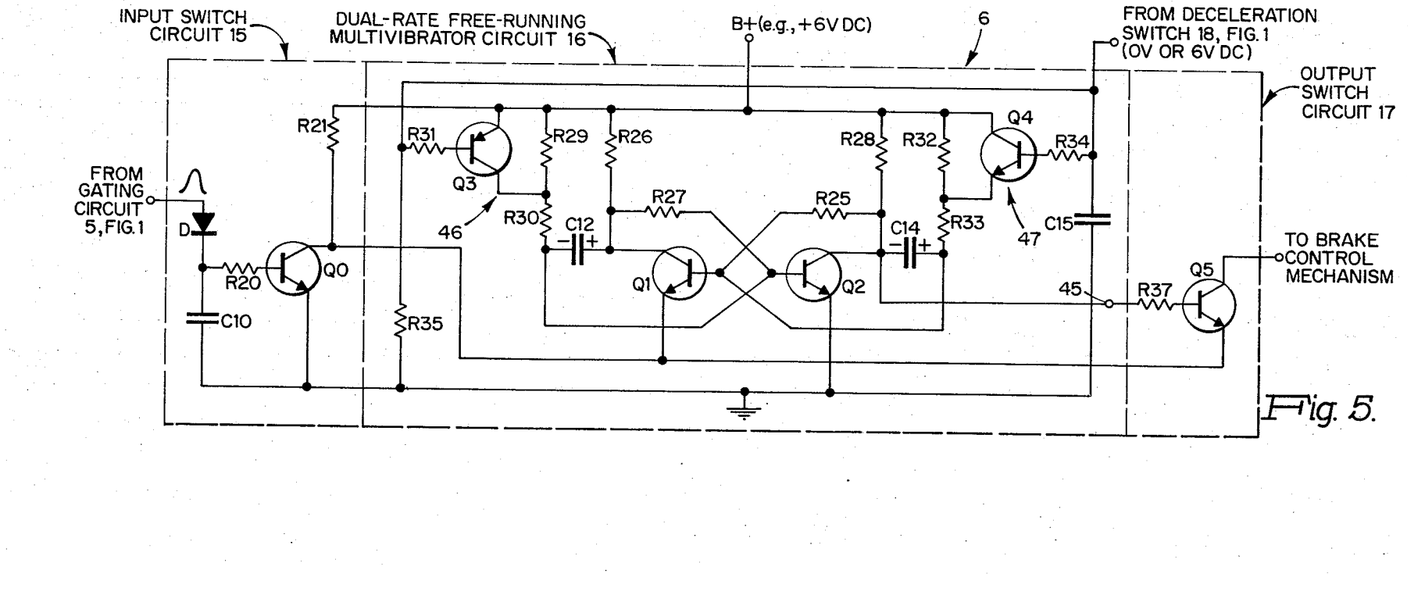
FIG. 5 is a schematic representation of a load control circuit of a preferred form which may be employed in the electronic control module of FIG. 1.

DIFFERENTIATOR — AMPLIFIER, COMPARATOR, AND LOAD CONTROL CIRCUITS — FIGS. 4 AND 5

Each of the abovedescribed circuits comprising the electronic control module 1 of FIG. 1 may be implemented by a variety of conventional circuits well known to those skilled in the art. However, particularly suitable and novel implementations of the deceleration threshold dc signal processing circuit 3 and the load control circuit 6 are illustrated in FIGS. 4 and 5, respectively.

As shown in FIG. 4, the differentiator-amplifier circuit 12 included in the deceleration threshold dc signal processing circuit 3 includes a linear differential amplifier A1. The linear differential amplifier A1, which may be one of several well-known commercially available operational amplifiers, includes, in a conventional fashion, an inverting input terminal 20, a non-inverting input terminal 21, an inverting bias terminal 22, a non-inverting bias terminal 23, a common-point terminal 24, and an output terminal 25. The inverting input terminal 20 is coupled to a signal-receiving input terminal 30 via a capacitor C1, and the non-inverting input terminal 21 is coupled by means of a coupling resistor R1 to the juncture of a pair of resistors R2 and R3. The remote end of the resistor R2 is connected directly to system ground potential (e.g., the chassis of the vehicle) and the remote end of the resistor R3 is connected directly to the positive terminal of a voltage regulating circuit 31. As is evident from FIG. 4, the resistors R2 and R3 are arranged in a voltage-divider configuration. In addition to the above-mentioned connections, the inverting bias terminal 22 is directly connected to ground potential, the non-inverting bias terminal 23 is connected directly to the positive terminal of the voltage regulating circuit 31, and the common-point terminal 24 is connected directly to the juncture of the voltage divider resistors R2 and R3. The desired value of gain of the linear differential amplifier A1 is achieved in a conventional manner by means of a feedback resistor R4 of appropriate value connected between the inverting input terminal 20 and the output terminal 25. Frequency stability of the linear differential amplifier A1 is achieved in a conventional manner by a capacitor C2 of appropriate value also connected between the inverting input terminal 20 and the output terminal 25.

The comparator circuit 13 of FIG. 4, like the differentiator-amplifier circuit 12, also includes a linear differential amplifier. As indicated in FIG. 4, a second linear differential amplifier A2 is provided having a non-inverting input terminal 35, an inverting input terminal 36, an inverting bias terminal 37, a non-inverting bias terminal 38, a common-point terminal 39, and an output terminal 40. For most effective operation, it is preferable that the linear differential amplifier A2 be of the same design as the linear differential amplifier A1. The non-inverting input terminal 35 of the linear differential amplifier A2 is coupled to the output terminal 25 of the linear differential amplifier A1 via a pair of series-connected resistors R5 and R6. A resistor R7 is connected between the juncture of the resistors R5 and R6 and ground potential and forms a voltage divider with the resistor R6 for providing voltage overload protection for the linear differential amplifier A2. The resistor R5 serves as a current-limiting resistor.

The inverting input terminal 36 of the linear differential amplifier A2 is coupled by means of a current-limiting resistor R8 to a series resistive reference voltage-setting arrangement 45 including a variable resistor R9, a resistor R10 connected between one end of the variable resistor R9 and ground potential, and a resistor R11 connected between the other end of the variable resistor R9 and the positive terminal of the voltage regulating circuit 31. The reference voltage-setting arrangement 45 serves to provide a dc deceleration threshold voltage to the inverting input terminal 36 of the linear differential amplifier A2. In addition to the above connections, the inverting bias terminal 37 of the linear differential amplifier A2 is connected directly to ground potential, the non-inverting bias terminal 38 is connected directly to the positive terminal of the voltage regulating circuit 31, and the common-point terminal 39, like the common-point terminal 24 of the linear differential amplifier A1, is connected directly to the juncture of the voltage-divider resistors R2 and R3. The output of the linear differential amplifier A2 is taken at the output terminal 40.

The voltage regulating circuit 31 shown in FIG. 4 may be implemented by a variety of well known circuits. However, a preferred form of the voltage regulating circuit 31 for use in the present invention includes circuitry for converting the positive-voltage output of a standard 12-volt automobile battery, which voltage output may vary over a range of about 8–15 volts, to a lower, regulated value suitable for use with the linear differential amplifiers A1 and A2, for example, 6.2–6.8 volts. A particularly suitable voltage regulating circuit which satisfies the above requirements is described in detail and also claimed in a co-pending patent application of Lucian F. Emerson, Ser. No. 311,929, filed concurrently herewith, entitled "Voltage Regulating Circuit," and assigned to the same assignee as the present application. Reference may be made to the abovementioned co-pending application for specific details.

The deceleration threshold dc signal processing circuit 3 of FIG. 4 operates in the following manner. In the quiescent operating state of the deceleration threshold dc signal processing circuit 3, that is, with no signal present at the input terminal 30, a positive input voltage signal $V_{A1}$ having a value relative to ground potential of $$(R2)/(R2 + R3) (V_c),$$

where $V_c$ is the value of the positive voltage from the voltage regulating circuit 31, is present at the non-inverting input terminal 21 of the linear differential amplifier A1 due to the voltage divider resistors R2 and R3. With the above input condition at the non-inverting input terminal 21, a positive output voltage signal $V_{A1(OUT)}$, equal to $V_{A1}$, is presented by the linear differential amplifier A1 at the output terminal 25 and also to the inverting input terminal 20 via the feedback resistor R4. Accordingly, both of the input terminals 20 and 21 are at the same voltage in the quiescent operating state.

The output voltage signal $V_{A1(OUT)}$ at the output terminal 25 of the linear differential amplifier A1 is applied to the voltage divider resistors R6 and R7 and a positive voltage signal $V_{A2}$ having a value relative to ground potential of $$R7/(R6 + R7) (V_{A1(OUT)}),$$

is presented to the non-inverting input terminal 35 of the linear differential amplifier A2 due to the voltage divider resistors R6 and R7. A constant, positive dc reference voltage signal is applied by the resistive reference voltage-setting arrangement 45 to the inverting input terminal 36 of the linear differential amplifier A2. The value of the positive dc reference voltage signal applied to the inverting input terminal 36 of the linear differential amplifier A2 during the quiescent operating state is established to be the same as the value of the voltage signal $A_{A2}$ present at the non-inverting input terminal 35. This condition is achieved by appropriately controlling the value of the variable resistor R9. With both of the input terminals 35 and 36 at the same voltage, the linear differential amplifier A2, which is connected to operate as a differential voltage comparator, detects no difference between the two input voltage signals and, therefore, causes the voltage at the output terminal 40, $V_{A2(OUT)}$, to be at 0 volts.

The non-quiescent operating state of the deceleration threshold dc signal processing circuit 3, that is, with a signal [FIG. 2(f)] from the ac to dc converter circuit 11 (FIG. 1) present at the input terminal 30, is as follows. The amplitude-varying dc "velocity" voltage signal produced by the ac to dc converter circuit 11 [FIG. 2(f)] and applied to the input terminal 30 is differentiated by the capacitor C1 to detect instantaneous changes in the amplitude of the "velocity" voltage signal. A positive-going voltage spike is produced by the capacitor C1 in response to each increase in the level of the "velocity" voltage signal (indicating an increase in vehicle velocity) and a negative-going voltage spike is produced by the capacitor C1 in response to each decrease in the level of the "velocity" voltage signal (indicating a decrease in vehicle velocity). The amplitude of each voltage spike produced by the capacitor C1 depends on the amount of change detected by the capacitor C1 and is directly related thereto. Each voltage spike produced by the capacitor C1 is applied to the inverting input terminal 20 of the linear differential amplifier A1. As in the quiescent operating state of the deceleration threshold dc signal processing circuit 3, a dc voltage signal $V_{A1}$ having a value relative to ground potential of $$R2/(R2 + R3) (V_c)$$

is applied to the non-inverting input terminal 21 of the linear differential amplifier A1 by the voltage divider resistors R2 and R3, and also to the inverting input terminal 20 via the output terminal 25 and the feedback resistor R4. Since the bi-polar voltage spikes produced by the capacitor C1 ride on the dc voltage signal $V_{A1}$ present at the non-inverting input terminal 20, voltage differences are established between the input signals applied to the input terminals 20 and 21 and the linear differential amplifier A1 accordingly operates to amplify and invert the bi-polar voltage spikes applied to the inverting input terminal 20. The amplified and inverted bi-polar voltage spikes are presented at the output terminal 25 of the linear differential amplifier A1.

Each output voltage spike presented at the output terminal 25 of the linear differential amplifier A1, designated $V_{A1(OUT)}$, is applied to the juncture of the voltage divider resistors R6 and R7 and a fractional portion thereof, equal to $$R7/(R6 + R7)(V_{A1(OUT)}),$$

is applied to the non-inverting input terminal 35 of the linear differential amplifier A2 [FIG. 2(g)]. A constant, positive dc reference voltage signal [FIG. 2(g)], of the same value as established for the quiescent operating state of the deceleration threshold dc signal processing circuit 3, is applied to the inverting input terminal 36 by the resistive reference voltage-setting arrangement 45. The linear differential amplifier A2 operates to compare each positive-going voltage spike presented to the non-inverting input terminal 35 with the constant, positive dc reference voltage signal and to produce a positive maximum-gain load control pulse [FIG. 2(h)], measured relative to ground potential, when the value of a positive-going voltage spike exceeds the value of the constant, positive dc reference voltage signal. No load control pulse is produced for negative-going voltage spikes applied to the non-inverting input terminal 35 inasmuch as the inverting bias terminal 37 is at ground potential and, therefore, prevents negative-going voltage spikes from driving the linear differential amplifier A2. The output produced by the linear differential amplifier A2 in response to each negative-going voltage spike at the non-inverting input terminal 35 is thus at 0 volts. Each positive maximum gain load control pulse produced by the linear differential amplifier A2 at the output terminal 40 [FIG. 2(h)] in response to a positive-going voltage spike presented to the non-inverting input terminal 35 is applied to the gating circuit 5 for additional processing, as briefly described hereinbefore and as will be described in greater detail hereinafter.

The abovedescribed deceleration threshold dc signal processing circuit 3 of FIG. 4 is described and also claimed in a co-pending patent application of Lucian F. Emerson, Ser. No. 311,928, filed concurrently herewith, entitled "DC Signal Processing Circuit," and assigned to the same assignee as the present application.

Referring now to FIG. 5, there is shown in detail the load control circuit 6 which, as mentioned before, includes the input switch circuit 15, the dual-rate free-running multivibrator 16, and the output switch circuit 17. As shown in FIG. 5, the input switch circuit 15 includes a diode D, a capacitor C10, a resistor R20, an input npn transistor Q0, and a pull-down resistor R21. The diode D is connected at its anode electrode to the gating circuit 5 and at its cathode electrode to one end of the capacitor C10. The other end of the capacitor C10 is connected directly to ground potential. The resistor R20 is connected to the juncture of the diode D and the capacitor C10 and to the base of the transistor Q0. The emitter of the transistor Q0 is connected directly to ground potential, and the collector is connected through the resistor R21 to the emitter of a pnp transistor Q3 provided within the dual-rate free-running multivibrator circuit 16. In the operation of the timing switch circuit 15, each positive load control pulse [FIG. 2(h)] produced by the deceleration threshold comparator circuit 13 and gated through the gating circuit 5 passes through the diode D and charges the capacitor C10. When the capacitor C10 is charged to a value of voltage sufficient to forward bias the transistor Q0, the transistor Q0 conducts and places the emitter of an npn transistor Q1 included in the dual-rate free-running multivibrator circuit 16 at essentially ground potential. As will be described hereinafter, this latter operation of the transistor Q0 initiates multivibrator action on the part of the dual-rate free-running multivibrator circuit 16. Once the transistor Q0 has been operated in its conducting condition and after termination of the load control pulse, the capacitor C10 is able to discharge to ground potential via the resistor R20 and the conducting transistor Q0. The rate at which the capacitor C10 discharges is a function of the values of the capacitor C10 and the resistor R20. As the capacitor C10 discharges to a level no longer able to forward bias the transistor Q0, the transistor Q0 becomes increasingly non-conducting and when the transistor Q0 becomes completely non-conducting the operation of the dual-rate free-running multivibrator circuit 16 terminates.

The dual-rate free-running multivibrator circuit 16 of FIG. 5 includes the aforementioned npn transistor Q1 and a similar npn transistor Q2 which, as is evident from FIG. 5, are interconnected in a common free-running multivibrator configuration. More specifically, the base of the transistor Q1 is coupled through a commutation resistor R25 to the collector of the transistor Q2, and the collector is coupled through a load resistor R26 to a source of positive dc voltage B+. The emitter of the transistor Q1 is connected directly to the collector of the input transistor Q0 provided within the input switch circuit 15. In a manner similar to the transistor Q1, the base of the transistor Q2 is coupled through a commutation resistor R27 to the collector of the transistor Q1, and the collector is coupled through a load resistor R28 to the source of positive dc voltage B+. The collector of the transistor Q2 is also connected to an output terminal 45 to which output pulses produced at the collector of the transistor Q2 are applied. The emitter of the transistor Q2 is connected directly to ground potential. In addition to the abovementioned circuit components, and as is also common in free-running multivibrator circuits, a capacitor C12 is connected between the collector of the transistor Q1 and the base of the transistor Q2, and a capacitor C14 is similarly connected between the collector of the transistor Q2 and the base of the transistor Q1.

The dual-rate manner of operation of the multivibrator circuit 16 by which first and second trains of output pulses having different repetition rates are produced at the output terminal 45 of the multivibrator circuit 16 is achieved by establishing two sets of time constants for controlling the operation of the transistors Q1 and Q2, and, therefore, the off and on times for the transistors Q1 and Q2. This control of the RC time constants and the off/on times of the transistors Q1 and Q2 is accomplished by the inclusion in the mulivibrator circuit 16 of a pair of variable-resistance arrangements 46 and 47. As shown in FIG. 6, the variable-resistance arrangement 46 includes a pair of resistors R29 and R30 connected in series with the source of positive dc voltage B+ and the capacitor C12, and a pnp transistor Q3 connected in parallel with the resistor R29 via its emitter and collector. The base of the transistor Q3 is coupled through a current-limiting resistor R31 to the deceleration switch 18. In a similar fashion as described above, the variable-resistance arrangement 47 includes a pair of resistors R32 and R33 connected in series with the source of positive dc voltage B+ and the capacitor C14, and an npn transistor Q4 connected in parallel with the resistor R32 via its collector and emitter. The base of the transistor Q4 is coupled through a current-limiting resistor R34 to the deceleration switch 18. The dual-rate free-running multivibrator circuit 16 further includes a resistor R35 connected between the resistor R31 and ground potential and a capacitor C15 connected between the resistor R34 and ground potential. The purpose of the resistor R35 is to prevent the transistor Q3 from being overdriven, and the purpose of the capacitor C15 is to prevent the two transistors Q3 and Q4 from operating in their on states concurrently in the event of "chattering" of the deceleration switch 18.

The deceleration switch 18, as employed in the present invention, is capable of supplying a dc voltage to the multivibrator circuit 16 having a first value, for example, 0 volts dc, when a wheel lock-up condition is imminent on a low coefficient of friction road surface, and a second value, for example, +6 volts dc, when a wheel lock-up condition is imminent on a high coefficient of friction road surface. A typical value of the positive dc voltage B+ which may be used with the two values of voltage produced by the deceleration switch 18 is +6 volts. The operation of the dual-rate free-running multivibrator circuit 16 is as follows.

In the quiescent mode of operation of the dual-rate multivibrator circuit 16, that is, with the transistor Q0 in its non-conducting condition, the emitter of the transistor Q1 is open circuited, and the transistor Q1 operates in its non-conducting, or "off," state. With the transistor Q1 operating in its non-conducting state, the voltage at its collector is at essentially the voltage B+ and the voltage at the base of the transistor Q2 at this time is sufficient to forward bias the transistor Q2 into its conducting, or "on," state, causing the collector of the transistor Q2 to be at essentially ground potential (approximately 0 volts). The collector of the transistor Q2 remains at essentially ground potential until the transistor Q0 is operated in its conducting condition.

With the abovedescribed quiescent operating states for the transistors Q1 and Q2, the collector side of the capacitor C12 is at a high value of voltage (at essentially B+), and the other side, by virtue of its connection to the base of the conducting transistor Q2, is at a low value of voltage (at essentially ground potential). Similarly, the collector side of the capacitor C14 is at a low value of voltage, by virtue of the transistor Q2 being in its conducting state, and the other side, by virtue of its connection to the base of the non-conducting transistor Q1, is at a high value of voltage. These voltage conditions affecting the capacitors C12 and C14 cause voltages of essentially equal value to be established across the capacitors C12 and C14 in preparation for initiating multivibrator action once the transistor Q0 is operated in its conducting condition. Specifically, a charge path exists for charging the capacitor C12 which includes the source of positive dc voltage B+ and the load resistor R26, and a charge path exists for charging the capacitor C14 which includes the source of positive dc voltage B+ and the resistors R32 and R33. The time required for charging each of the capacitors C12 and C14 is determined principally by the values of the aforementioned resistors R32 and R33, and the values of the capacitors C12 and C14.

To produce a train of output pulses at the output terminal 45 of the multivibrator circuit 16, the transistor Q0 must be operated in its conducting condition and a first or second value of dc voltage must be received from the deceleration switch 18. When the deceleration switch 18 produces its 0-volt signal, zero volts are supplied to the multivibrator circuit 16 and the multivibrator circuit 16 operates to produce output pulses at the output terminal 45 having a first ratio of off/on times, that is, a first repetition rate; when the deceleration switch 18 produces its +6-volt signal, +6 volts are supplied to the multivibrator circuit 16 and the multivibrator circuit 16 operates to produce output pulses at the output terminal 45 having a second ratio of off/on times, that is, a second repetition rate. Assuming initially that the transistor Q0 has been operated in its conducting condition by a load control pulse from the deceleration threshold circuit 13 and that the deceleration switch 18 is producing its 0-volt signal, the operation of the multivibrator circuit 16 may be explained as follows.

With the transistor Q0 operating in its conducting condition, the emitter of the transistor Q1 is placed at ground potential whereby multivibrator action is initiated. Specifically, with the emitter of the transistor Q1 placed at ground potential, the voltage earlier established across the capacitor C14 (before the transistor Q0 conducts) is applied to and acts at the base of the transistor Q1. This voltage is positive and of sufficient value to initiate forward biasing the transistor Q1 into its conducting (on) state. As the transistor Q1 is initially biased into its conducting state, the capacitor C12 discharges, causing a negative voltage spike to be applied to the base of the transistor Q2. This negative voltage spike reverse biases the transistor Q2 into its non-conducting (off) state, resulting in an increase in the collector voltage of the transistor Q2 in a positive direction. This collector voltage is coupled via the commutation resistor R25 into the base of the transistor Q1 and causes the transistor Q1 to operate more fully in its conducting state.

With the transistor Q2 operating in its non-conducting state and the transistor Q1 operating in its conducting state, the capacitor C12 is gradually charged to a voltage level for again forward biasing the transistor Q2 into its conducting state. The charge path of the capacitor C12 at this time includes the source of positive dc voltage B+ and the effective resistance of the variable-resistance arrangement 46. The effective resistance of the variable-resistance arrangement 46 is determined at this time by the state of the deceleration switch 18. Specifically, with the deceleration switch 18 in its 0-volt producing state, as assumed hereinabove, a zero-voltage condition is established at the base of the pnp transistor Q3. Since the emitter of the transistor Q3 is at a positive voltage (+B) with respect to the base, the transistor Q3 is forward biased into its conducting state. While in the conducting state, the transistor Q3 shunts the resistor R29 and thereby establishes an effective resistance for the variable-resistance arrangement 46 having a value equal to the value of the resistor R30. Thus, the capacitor C12 is charged at this time through the un-shunted resistor R30 and not through the series combination of resistors R29 and R30. (A small amount of additional voltage is developed across the capacitor C12 at this time by virtue of current flow through the load resistor R26 and the commutation resistor R27, but the value of this additional voltage is negligible when compared with the value of voltage developed across the capacitor C12 by virtue of current flow through the resistor R30). It is to be noted that as the above operations involving the capacitor C12 and the variable-resistance arrangement 46 take place, the npn transistor Q4 provided in the other variable-resistance arrangement 47 is not operated in its conducting state, that is, it is reverse biased, by virtue of its emitter being at a positive voltage greater than 0 volts.

When the value of the voltage across the capacitor C12 increases to the value of the forward-bias voltage of the transistor Q2, the transistor Q2 once again starts to operate in its conducting state. As the transistor Q2 starts to operate in its conducting state and its collector voltage starts to drop to its low value, the capacitor C14 discharges, causing a negative voltage spike to be applied to the base of the transistor Q1. This negative voltage spike serves to reverse bias the transistor Q1 in its non-conducting state and to cause the voltage at the collector of the transistor Q1 to increase in a positive direction. The collector voltage of the transistor Q1 is coupled into the base of the transistor Q2 (via the commutation resistor R27) and causes the transistor Q2 to operate more fully in its conducting state. The capacitor C14 is then gradually charged again, via a charge path including the source of positive dc voltage B+ and the resistors R32 and R33, until the voltage across the capacitor C14 reaches the forward bias voltage of the transistor Q1. This charging operation therefore determines the off time for the transistor Q1. When the voltage across the capacitor C14 reaches the forward bias voltage of the transistor Q1, the transistor Q1 starts to operate again in its conducting state, thereby initiating the turn off of the transistor Q2. The abovedescribed operation of the multivibrator circuit 16 continues until such time as the transistor Q0 operates in its non-conducting condition at which time the multivibrator action of the multivibrator circuit 16 is terminated.

It is evident from the abovedescribed discussion, therefore, that with the deceleration switch 18 in its 0-volt producing state, the off time of the transistor Q1 and the on time of the transistor Q2 are each determined essentially by the values of the resistors R32 and R33 and the capacitor C14 and the on time of the transistor Q1 and the off time of the transistor Q2 are each determined essentially by the value of the resistor R30 and the capacitor C12. As the above-described multivibrator action takes place, a train of output pulses of a first repetition rate is produced at the collector of the transistor Q2 and, thus, at the output terminal 45. This train of output pulses is applied via a current-limiting resistor R37 to the base of an npn transistor Q5 provided in the output switch circuit 17. With the emitter of the transistor Q5 at essentially ground potential, due to the conduction of the transistor Q0, the train of output pulses produced by the dual-rate file-running multivibrator 16 is inverted by the transistor Q5 and applied to the brake control mechanism. The configuration of the train of output pulses produced at the collector of the transistor Q5, with the deceleration switch 18 in its 0-volt producing state is shown in FIG. 2(i) (in expanded scale).

The operation of the multivibrator circuit 16 when the deceleration switch 18 is in its 6-volt producing state is essentially the same as that described hereinabove. However, in this case, the transistor Q4 is forward biased into its conducting state, by virtue of the voltage at its base being sufficiently positive (approximately +6 volts) with respect to the emitter, and the transistor Q3 is reverse biased in its non-conducting state, by virtue of the value of voltage at its base (approximately +6 volts) being essentially equal to the value of the voltage (e.g., +6 volts) at its emitter. With the transistor Q4 operating in its conducting state, the resistor R32 is shunted whereby the unshunted resistor R33 serves as the principal charging resistor for the capacitor C14. In the present case, therefore, the off time of the transistor Q1 and the on time of the transistor Q2 are each determined essentially by the values of the resistor R33 and the capacitor C14, and the on time of the transistor Q1 and the off time of the transistor Q2 are each determined essentially by the values of the resistors R29 and R30 and the capacitor C12. A train of output pulses of a second repetition rate is produced at the collector of the transistor Q2 and, thus, at the output terminal 45. This train of output pulses is inverted by the transistor Q5 and applied to the brake control mechanism. The configuration of the train of output pulses, with the deceleration switch 18 in its 6-volt producing state, is shown in FIG. 2(j) (in expanded scale).

It is clear, therfore, that by the appropriate selection of values for the resistors R29, R30, R32 and R33 and for the capacitors C12 and C14, the off/on times of the pulses produced at the collector of the transistor Q5 of the output switch circuit 17 may be made to have a variety of different possible values. As a result, pulse trains having different repetition rates may be readily achieved. The abovedescribed dual-rate free-running multivibrator circuit 16, with slight modification, is described and also claimed in a co-pending application of Allen F. Hillman, Ser. No. 311,930, filed concurrently herewith, entitled "Dual-Rate Multivibrator Circuit," and assigned to the same assignee as the present application.

While there has been shown and described what is consideted a preferred embodiment of the invention, it will be obvious that various changes and modifications may be made therein without departing from the invention as called for in the appended claims.

What is claimed is:

1. An electronic module for an anti-skid braking system for operating the brake control mechanism of a wheeled vehicle, comprising:

first means operative while the vehicle is in motion to provide a velocity signal representative of the rotational velocity of at least one wheel of the vehicle;

second means coupled to the first means and operative to detect decreases in the value of the velocity signal produced by the first means and to produce output signals corresponding to the decreases;

third means coupled to the second means and operative to compare the value of each output signal produced by the second means with the value of a deceleration reference signal corresponding to a predetermined value of wheel deceleration indicating the imminence of a wheel lock-up condition and to produce an output signal whenever the value of an output signal produced by the second means bears a predetermined relationship to the value of the deceleration reference signal;

deceleration means associated with the vehicle and operative when the vehicle decelerates at a rate less than a predetermined rate to produce a first control signal and operative when the vehicle decelerates at a rate greater than the predetermined rate to produce a second control signal; and load control means coupled to the third means and to the deceleration means and having an output connection adapted to be coupled to the brake control mechanism of the vehicle, said load control means being operative in response to an output signal produced by the third means and in response to a first control signal produced by the deceleration means to produce and apply to the output connection thereof a first train of output pulses having a first repetition rate, and operative in response to an output signal produced by the third means and in response to a second control signal produced by the deceleration means to produce and apply to the output connection thereof a second train of output pulses having a second repetition rate.

2. An anti-skid braking system in accordance with claim 1 wherein:

the deceleration means includes a decelerometer.

3. An electronic module in accordance with claim 1 wherein:

the load control means includes a dual-rate multivibrator circuit.

4. An electronic module in accordance with claim 1 wherein the load control means includes:

input means coupled to the third means and operative to receive each output signal produced by the third means, said input means being operative in response to each output signal produced by the third means to produce a corresponding output signal of a predetermined duration; and dual-rate multivibrator circuit means coupled to the input means and to the deceleration means and operative to receive each output signal produced by the input means and the first and second control signals produced by the deceleration means, said dual-rate multivibrator circuit means being operative in response to an output signal produced by the input means and a first control signal produced by the deceleration means to produce a first train of output pulses having a first repetition rate for the duration of the output signal produced by the input means, and operative in response to an output signal produced by the input means and a second control signal produced by the deceleration means to produce a second train of output pulses having a second repetition rate for the duration of the output signal produced by the input means.

5. An electronic module in accordance with claim 4 wherein:

the deceleration means includes a decelerometer.

6. An electronic module in accordance with claim 5 wherein the load control means further includes:

output means coupled to the input means and to the dual-rate multivibrator circuit means and operative to receive each output signal produced by the input means and each train of output pulses produced by the dual-rate multivibrator circuit means, said output means being operative in response to each output signal produced by the input means and a train of output pulses produced by the dual-rate multivibrator circuit means to invert and apply the train of output pulses to an output connection.

7. An electronic module in accordance with claim 1 wherein:

the wheel of the vehicle is a rear wheel of the vehicle; and the first means includes a wheel velocity-sensing means associated with the rear wheel of the vehicle and operative while the vehicle is in motion to produce a pulse train having a frequency varying in direct proportion to the rotational velocity of the rear wheel.

8. An electronic module in accordance with claim 7 wherein:

the first means further includes means coupled to the wheel velocity-sensing means and operative to convert the pulse train produced by the wheel velocity-sensing means into a dc velocity signal having an amplitude varying in accordance with variations in the frequency of the pulse train produced by the wheel velocity-sensing means.

9. An electronic module in accordance with claim 7 wherein:

the vehicle includes a drive shaft cooperating with the rear wheel of the vehicle; and the wheel velocity-sensing means comprises:

a slotted disc adapted to be fixedly mounted on the drive shaft of the vehicle and adapted to rotate with the drive shaft;

a light source adapted to be arranged on one side of the slotted disc, said slotted disc operating to chop light produced by the light source at a frequency varying in accordance with variations in the rotational velocity of the drive shaft; and a photoresponsive device on the other side of the slotted disc in optical alignment with the light source and operative to receive the light chopped by the slotted disc and to convert the chopped light to a train of pulse signals having a frequency varying in accordance with the variations in the rotational velocity of the drive shaft.

10. An electronic module for operating the brake control mechanism of a wheeled vehicle, comprising:

first means operative while the vehicle is in motion to provide a velocity signal representative of the rotational velocity of at least one wheel of the vehicle;

second means coupled to the first means and operative to detect decreases in the value of the velocity signal produced by the first means and to produce output signals corresponding to the decreases;

velocity circuit means coupled to the first means and operative when the velocity signal produced by the first means has a value greater than a predetermined value corresponding to a predetermined cutout velocity to produce an output signal;

braking circuit means operative to produce an output signal whenever the vehicle is being braked;

third means coupled to the second means and operative to compare the value of each output signal produced by the second means with the value of a deceleration reference signal corresponding to a predetermined value of wheel deceleration indicating the imminence of a wheel lock-up condition and to produce an output signal whenever the value of an output signal produced by the second means bears a predetermined relationship to the value of the deceleration reference signal;

gating means coupled to the velocity circuit means, the braking circuit means, and to the third means and operative to receive the output signals produced by said means, said gating means being operative only in response to output signals produced by the velocity circuit means and the braking circuit means to gate therethrough an output signal produced by the third means;

deceleration means associated with the vehicle and operative when the vehicle decelerates at a rate less than a predetermined rate to produce a first control signal and operative when the vehicle decelerates at a rate greater than the predetermined rate to produce a second control signal; and load control means coupled to the gating means and to the deceleration means and having an output connection adapted to be coupled to the brake control mechanism of the vehicle, said load control means being operative in response to an output signal gated from the third means through the gating means and in response to a first control signal produced by the deceleration means to produce and apply to the output connection thereof a first train of output pulses having a first repetition rate, and operative in response to an output signal gated from the third means through the gating means and in response to a second control signal produced by the deceleration means to produce and apply to the output connection thereof a second train of output pulses having a second repetition rate.

11. An anti-skid braking system in accordance with claim 10 wherein:

the deceleration means includes a decelerometer.

12. An electronic module in accordance with claim 10 wherein:

the load control means includes a dual-rate multivibrator circuit.

13. An electronic module in accordance with claim 10 wherein the load control means includes:

input means coupled to the third means and operative to receive each output signal produced by the third means, said input means being operative in response to each output signal produced by the third means to produce a corresponding output signal of a predetermined duration; and dual-rate multivibrator circuit means coupled to the input means and to the deceleration means and operative to receive each output signal produced by the input means and the first and second control signals produced by the deceleration means, said dual-rate multivibrator circuit means being operative in response to an output signal produced by the input means and a first control signal produced by the deceleration means to produce a first train of output pulses having a first repetition rate for the duration of the output signal produced by the input means, and operative in response to an output signal produced by the input means and a second control signal produced by the deceleration means to produce a second train of output pulses having a second repetition rate for the duration of the output signal produced by the input means.

14. An electronic module in accordance with claim 13 wherein:

the deceleration means includes a decelerometer.

15. An electronic module in accordance with claim 13 wherein the load control means further includes:

output means coupled to the input means and to the dual-rate multivibrator circuit means and operative to receive each output signal produced by the input means and each train of output pulses produced by the dual-rate multivibrator circuit means, said output means being operative in response to each output signal produced by the input means and a train of output pulses produced by the dual-rate multivibrator circuit means to invert and apply the train of output pulses to an output connection.

* * * * *